United States Patent [19]

Kato et al.

[11] 4,291,553

[45] Sep. 29, 1981

[54] TORQUE LIMITER

[75] Inventors: Heizaburo Kato; Yoshio Ogawa, both of Tokyo, Japan

[73] Assignee: Kabushikikaisha Sankyo Seisakujo, Tokyo, Japan

[21] Appl. No.: 88,919

[22] Filed: Oct. 29, 1979

[30] Foreign Application Priority Data

Feb. 16, 1979 [JP] Japan .................................. 54-16221

[51] Int. Cl.$^3$ .............................................. F16D 7/00
[52] U.S. Cl. ..................................... 64/29; 192/56 R
[58] Field of Search ................ 64/29, 28 R; 192/56 R

[56] References Cited

U.S. PATENT DOCUMENTS

| | | | |
|---|---|---|---|
| 1,883,164 | 10/1932 | Vassakos | 64/29 |
| 2,875,601 | 3/1959 | Georges | 64/29 |
| 3,080,029 | 3/1963 | Stober | 64/29 |
| 3,429,407 | 2/1969 | Orwin et al. | 64/29 |
| 3,930,382 | 1/1976 | Timtngr | 64/29 |
| 4,199,964 | 4/1980 | Grey | 64/29 |

FOREIGN PATENT DOCUMENTS

| | | | |
|---|---|---|---|
| 2544919 | 4/1977 | Fed. Rep. of Germany | 64/29 |
| 586360 | 3/1977 | Switzerland | 64/29 |

*Primary Examiner*—Ira S. Lazarus
*Assistant Examiner*—Magdalen Moy
*Attorney, Agent, or Firm*—Neuman, Williams, Anderson & Olson

[57] ABSTRACT

A torque limiter comprises a driving member and a driven member disposed concentrically with the former. A drive-transmitting body made fast on the driving member has on its outer periphery several radial grooves which, in turn, hold torque-transmitting rollers of a size adapted to fit in the grooves. The upper and lower peripheral surfaces of the rollers are kept in pressure contact with the under end surface of a torque-transmitting-roller-supporting ring above the drive-transmitting body and with arcuate recesses formed on the upper surface of a driven member which is revolvably supported on the upper end surface of the lower portion of the driving member through a thrust bearing ring. A torque-spring-supporting sleeve is threadedly engaged with the outer periphery of the upper mounting portion of the driving member and is loaded with elastic pressure means in the form of torque springs. As long as the torque being applied to the limiter is below a predetermined critical level, the elastic pressure means press the torque-transmitting rollers through the supporting ring agaisnt the driven member, whereby the driving and driven members are driven together. If a more-than-critical torque is applied between those members, the torque-transmitting rollers urged against the arcuate recesses of the driven member will move away from the recesses, overcoming the elastic pressure means and thereby allowing the two members to run relative to each other.

4 Claims, 7 Drawing Figures

TORQUE LIMITER

BACKGROUND OF THE INVENTION

This invention relates to a torque limiter.

In general, the torque limiter functions to set a so-called critical torque, or a maximum limit of torque, more than which should not be applied between two machine elements. Whenever any excessive torque beyond the preset critical level is applied to one element on either side, the torque limiter will work to shut off the transmission of the torque to the other element. By this critical torque setting the limiter protects the machine, prevents an accident which might otherwise result in injury or death of the personnel, and provides useful means for torque control which may be incorporated in the mechanism of equipment.

The torque limiter interposed between the two machine elements must meet roughly in the following three characteristic requirements.

(1) Characteristic during normal operation (with no more than the critical torque)

The transmission of torque between two machine elements should be such that, as though the two are solidly fastened together by a rigid body (e.g., a rigid shaft or a pair of flanges), the torque acting on one machine element is exactly transmitted to the other without any loss.

(2) Characteristic during abnormal operation (with more than the critical torque)

The torque limiter is a safety device as already noted, and any torque in excess of the preset critical value must be positively shut off by the limiter and kept from transmission to the other machine element. Moreover, the limiter is not desirable if its critical torque setting varies largely with the conditions under which the device is used; the limiter is desired to work accurately whenever the preset value is reached. A limiter capable of generating a shutoff signal is preferred.

(3) Release characteristic

The characteristic of a torque limiter which has once shut off the torque transmission between two machine elements is desirably such that the two elements are completely free from each other, neither of which imparting any force to the other.

Heretofore, shear pins, shear plates, and shear rings have been employed as torque limiters that meet the foregoing characteristic requirements. They are of the breakdown or fracture type, so called because, when subjected to a shearing force greater than the allowable shearing stress due to application of an excessive torque, such a device is broken to shut off the torque transmission. (The transmissible torque corresponding to the allowable shearing stress is herein called the critical torque.) They have thus far been abundantly used as safety devices for many machines and appliances.

The fracture type devices are generally inexpensive and, once broken to shut off the torque transmission, they will not reset by themselves. In this sense they have been deemed more dependable for safe operation than torque limiters of other types, such as friction and ball types. The fracture type has, however, drawbacks. The most serious of the disadvantages is that, because the devices depend on the strength properties of material for the limiter action, they can sometimes be broken by the fatigue of the material itself even when the torque being transmitted is below the critical level. In certain applications, the devices do not always provide the safety in operation. In addition, they cannot in any way meet the requirements for torque control, sensing of overload, etc. For these reasons there has been a great need for a novel torque limiter which will replace those of the known types.

Japanese Patent Application Publication No. 23850/1963 and Patent Application Public Disclosure Nos. 31351/1973 and 51438/1974 disclose torque limiters of the so-called ball type in which balls move in axial directions to transmit or resist a torque. The proposed devices are still to unsatisfactory for torque control, overload detection, and other requirements.

A principal object of this invention, therefore, is to provide a novel, improved torque limiter which transmits torque and shuts it off by allowing torque-transmitting steel balls to move only axially of driving and driven members but confining the ball motion in the rotational and radial directions.

It is another object of the invention to provide an improved torque limiter which can be exactly set to a critical torque for overload release by merely turning a torque-spring-supporting sleeve.

Yet another object of the invention is to provide a torque limiter having the functions of the so-called one-point setting system which can perform overload release and resetting most effectively and, once the torque transmission has been shut off, the limiter cannot reset at any other point that the shutoff point.

An additional object of the invention is to provide a torque limiter which can simply generate an overload signal.

A further object of the invention is the provision of a torque limiter which is simple in construction, low at manufacturing cost, and has long service life.

SUMMARY OF THE INVENTION

In order to accomplish these objects, the torque limiter according to the invention is so constructed that a drive-transmitting body made fast on a driving member has on its outer periphery several radial grooves which, in turn, hold torque-transmitting rollers of a size adapted to fit in the grooves, the upper and lower peripheral surfaces of the rollers being kept in pressure contact with the under end surface of a torque-transmitting-roller-supporting ring above the drive-transmitting body and with arcuate recesses formed on the upper surface of a driven member which is revolvably supported on the upper end surface of the lower portion of the driving member through a thrust bearing ring, a torque-spring-supporting sleeve is threadedly engaged with the outer periphery of the upper mounting portion of the driving member, and, between the top walls of open-bottom cylindrical hollows of the torque-spring-supporting sleeve and a bearing ring revolvably supported by a group of bearing balls, there are disposed a plurality of torque springs, each around one of support rods threadedly engaged at the lower end portions with the bearing ring and loosely fitted at the upper end portions in the sleeve. In preferred embodiments of the invention, the torque limiter is built so that the upper surface of a flange of the driven member is integrally secured to the under surface of a separately provided table by mounting studs, the inner periphery of the torque-transmitting-roller-supporting ring and the backside of the flared inner periphery of the bearing ring are supported revolvably by a retaining ring fitted therebetween, and the thrust bearing ring consists of needles of a needle bearing and an O-ring. Also, an overload-sensing panel is integrally attached to upward extensions of the support rods in the support sleeve by a plurality of mounting screws, and the relative positions of the overload-sensing panel, torque springs, bearing balls, torque-transmitting rollers, table, and thrust bearing rings are such that they are arranged in the order mentioned lest the elastic pressure means of torque springs be adversely affected by the load on the table.

Thus, the present invention is of great practical value as it permits the realization of the objects, that is, (a) the possibility of releasing in case of an overload, (b) accurate adjustability of the critical torque against overload, (c) generation of an overload signal in a foolproof way, (d) negligible irregularity in rotation during the torque transmission, and (e) simplicity of construction, low manufacturing cost, and long service life.

BRIEF DESCRIPTION OF THE DRAWINGS

These and other objects and advantages of the invention will be more clearly understood from the following description taken in conjunction with the accompanying drawings showing embodiments thereof. In the drawings.

DESCRIPTION OF THE PREFERRED EMBODIMENTS

Figure 1:
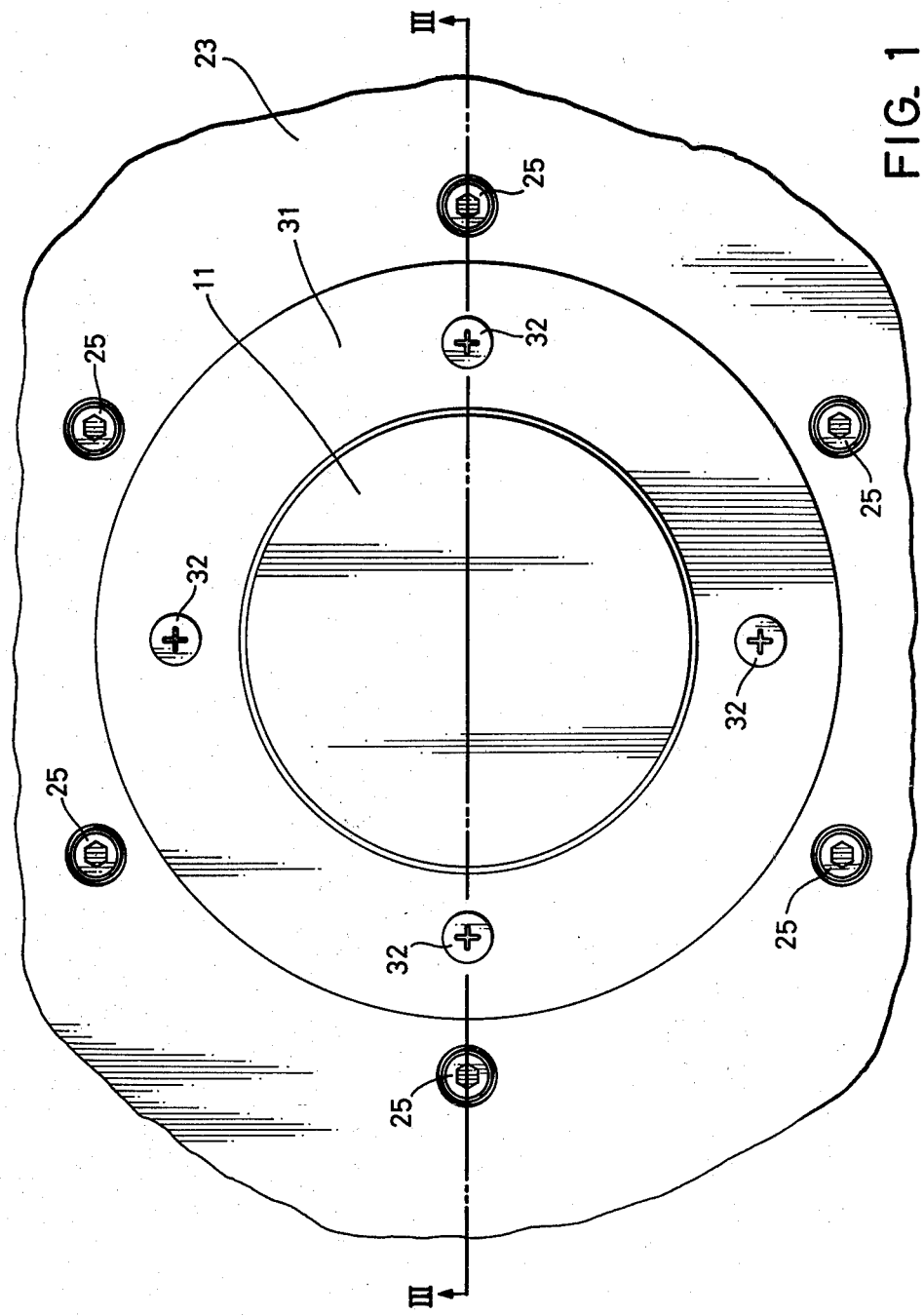
FIG. 1 is a plan view of an embodiment of the torque limiter of the invention.
Figure 2:
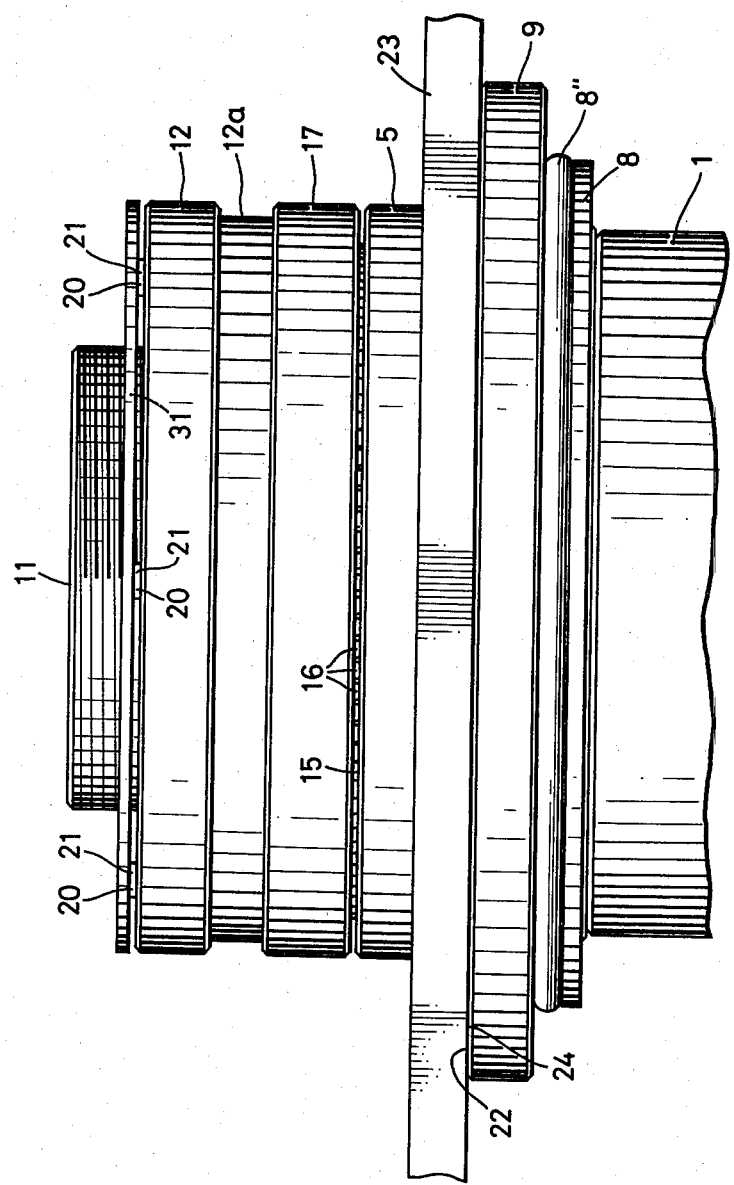
FIG. 2 is a front view of the limiter.

Referring now to the drawings, the torque limiter according to the invention will be described in detail.

Figure 3:
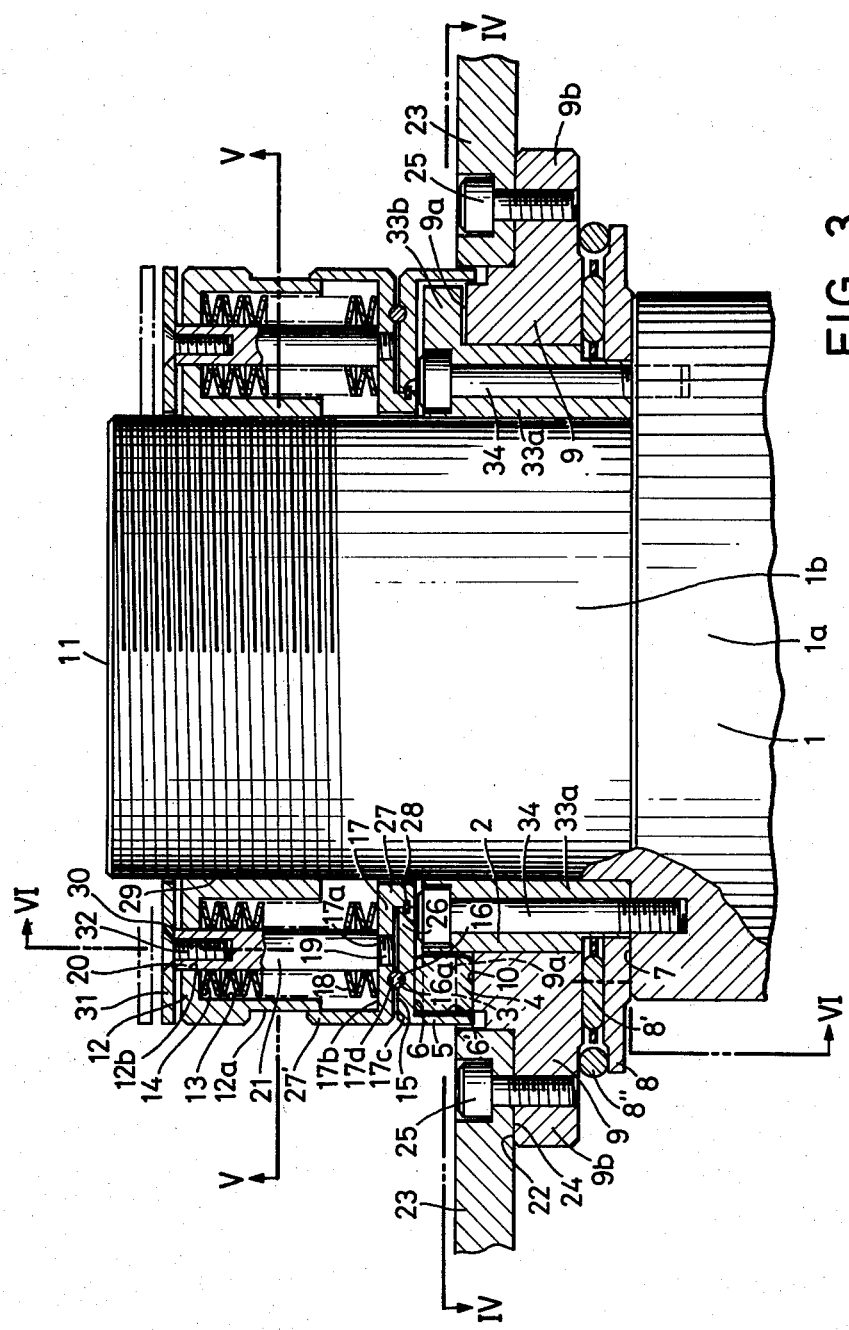
FIG. 3 is a sectional view taken on the line III—III of FIG. 1.
Figure 4:
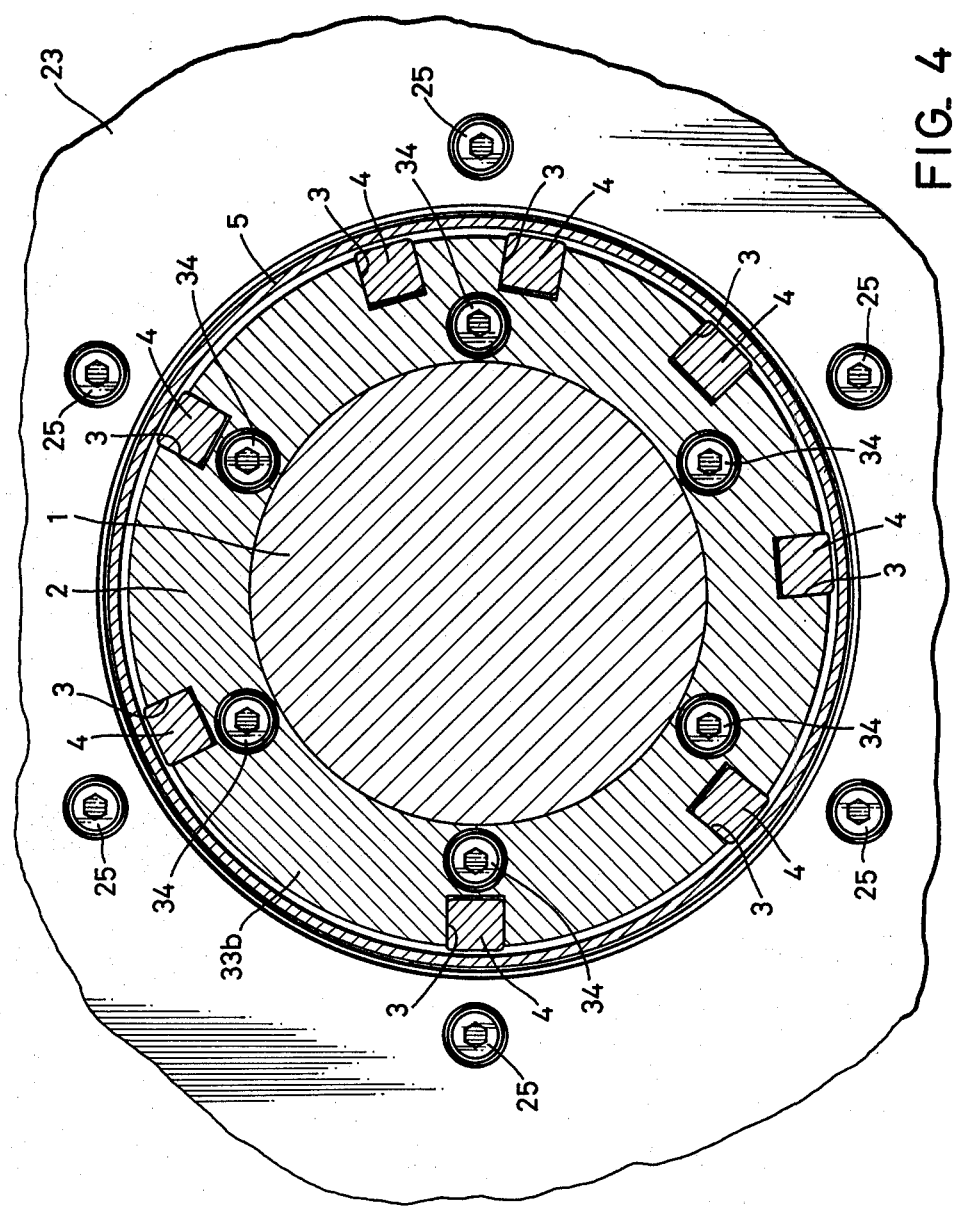
FIGS. 4 to 6 are sectional views taken, respectively, on the lines IV—IV, V—V, and VI—VI of FIG. 3.
Figure 6:
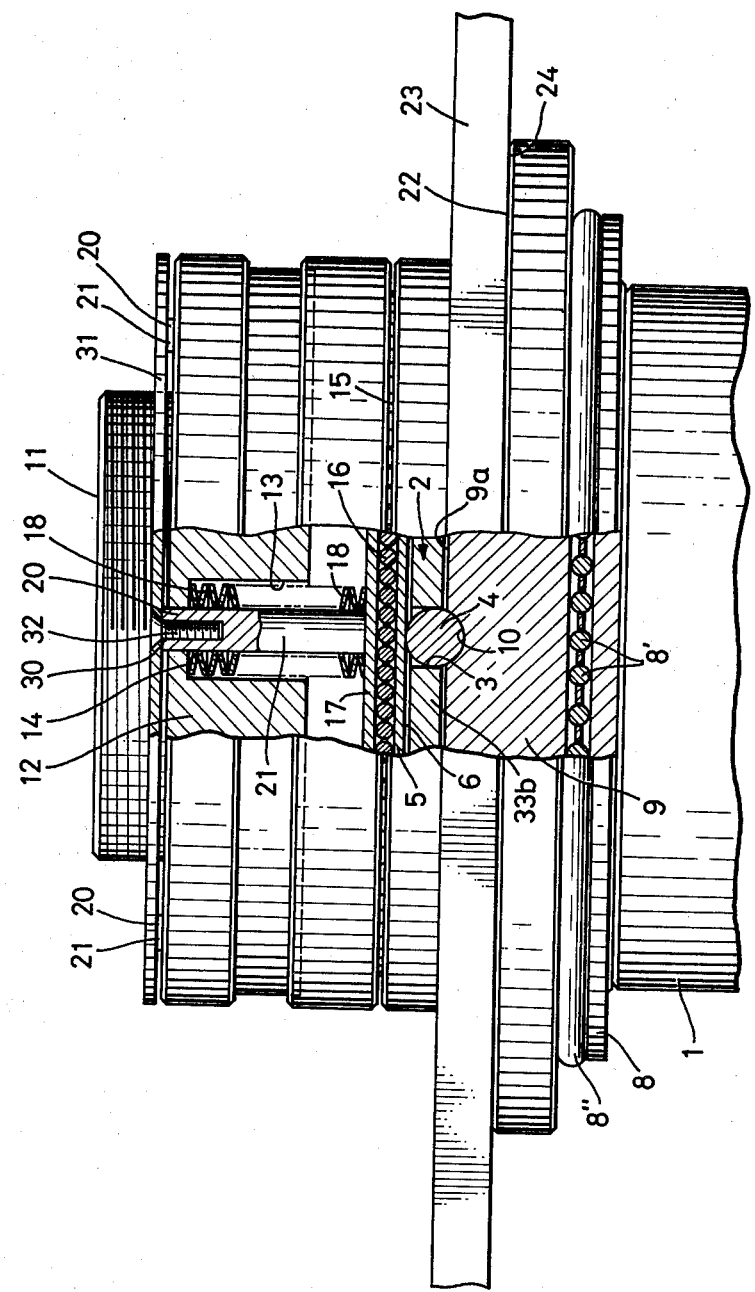

As best shown in FIG. 3, the driving member 1 of the torque limiter according to the invention consists of a drive shaft body 1a and a reduced-diameter extension 1b of the drive shaft, the shaft extension 1b terminating with an upper mounting portion 11, threaded on the periphery 29 for the purpose to be described later. A drive-transmitting body 2, which includes a guide cylinder 33a and a flange 33b, is provided in such a way that the guide cylinder 33a is fitted on the drive shaft extension 1b and is secured to the shoulder of the driving member 1, or the annular steplike end face 7 of the drive shaft 1a formed by the reduced-diameter extension 1b, by mounting studs 34. On the periphery of the guide cylinder 33a is rotatably mounted a driven member 9 between the flange 33b of the drive-transmitting body 2 and the end face 7 of the driving member 1. As better shown in FIGS. 4 and 6, the flange 33b of the drive-transmitting body 2 has several radial grooves 3 formed on its outer periphery. Corresponding to these grooves 3 of the flanges 33b, there are formed arcuate recesses 10 on the upper surface 9a of the driven member 9. The arcuate recesses 10 are desirably shaped to a curved section adapted to receive partly torque-transmitting rollers 4 which are fitted in the radial grooves 3, so that the rollers can move upwardly and downwardly relative to the grooves, or slide axially. Thus, each torque-transmitting roller 4 fitted in the groove 3 rests partly at the bottom in the corresponding recess 10 of the driven member 9. It should also be noted that the drive-transmitting body 2 and the rollers 4 are so built that, at this point, the opposite part or the top of each roller 4 slightly protrudes beyond the upper surface 9a of the drive-transmitting body 2.

The flange 33b of the drive-transmitting body 2 and the torque-transmitting rollers 4 are surrounded altogether by a cap-like, roller-supporting outer ring 5. The torque-transmitting rollers 4 are thus held between the lower end surface 6 of the roller-supporting outer ring 5 and the arcuate recesses 10 of the driven member and they are kept from deviating radially by an annular side wall 6' of the roller-supporting ring 5.

The driven member 9 is supported by a thrust bearing ring 8 disposed between the driven member 9 and the upper surface 7 of the driving member 1 so as to revolve with respect to the drive-transmitting body 2, that is, to the driving member 1 coaxially therewith. The thrust bearing ring 8 may be of an ordinary design, including needles 8' of a needle bearing and an O-ring 8". The driven member 9 may have a flange 9b on the outer periphery, which is fastened to the under surface 24 of a separately provided driven table 23 by studs 25, in order to transmit the turning effort from the driving member 1 to the driven table 23.

Figure 5:
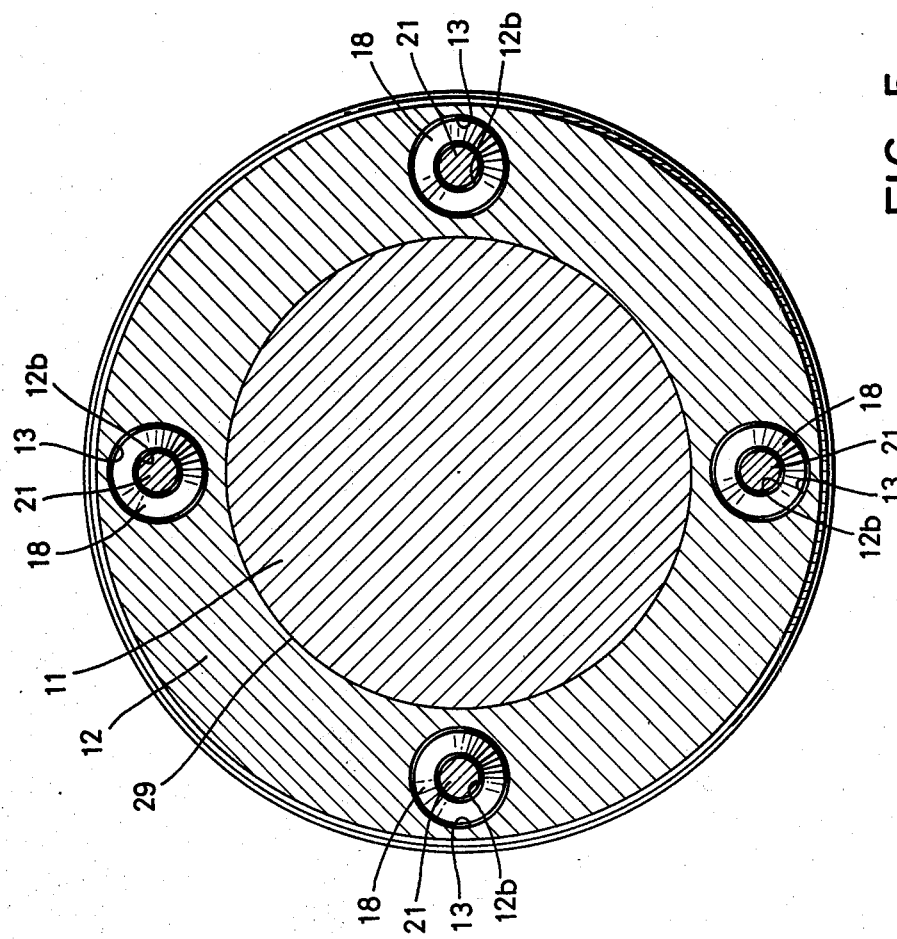

A torque-spring-supporting sleeve 12 is threadedly engaged with the upper mounting portion 11 of the drive shaft extension 1b of the driving member 1 at the threaded periphery 29. The sleeve 12 has a plurality of open-bottom cylindrical hollows 13 at equal intervals circumferentially, for example, four such hollows on the same circumference in the embodiment being described, as illustrated in FIG. 5. Between the torque-spring-supporting sleeve 12 and the torque-transmitting-roller-supporting outer ring 5 is loosely fitted a bearing ring 17, concentrically with the drive shaft extension 1b. This bearing ring 17 includes an inner periphery 27 and an outer periphery 27'. With the inner periphery 27 extending into a circular space formed between the drive shaft extension 1b and the inner periphery 26 of the torque-transmitting-roller-supporting outer ring 5 and the outer periphery 27' extending toward the torque-spring-supporting sleeve 12, the bearing ring 17 is removably fitted on a reduced-diameter lower portion 12a of the sleeve 12. The bearing ring 17 is formed with internally threaded holes 17a in alignment with the cylindrical hollows 13 of the torque-spring-supporting sleeve 12. Into this bearing ring 17, a plurality of support rods 21 are set at their lower end portions 19 of a reduced diameter in thread engagement with the threaded holes 17a of the ring. Each of the support rods 21 extends upward through a hole 12b formed in the top wall 14 of each cylindrical hollow 13 of the torque-spring supporting sleeve 12, concentrically with the hollow. To these extensions of the support rods 21 are fastened an overload-sensing panel 31, which is loosely fitted on the drive shaft extension 1b, by mounting screws 32. Torque springs 18 are loaded in spaces formed by the top walls 14 of the cylindrical hollows 13 of the torque-spring-supporting sleeve 12 and the upper surface 17b of the bearing ring 17. A group of balls 16 constituting a ball bearing is provided between the under surface 17c of the bearing ring 17 and the upper surface 15 of the torque-transmitting-roller-supporting ring 5. The bearing balls 16 are held in circular grooves 17d and 15a of an arcuate cross section formed on the same circumference, respectively, on the under surface 17c of the bearing ring 17 and the upper surface 15 of the roller-supporting ring. The inner periphery 26 of the torque-transmitting-roller-supporting ring 5 is kept from moving axially downward by a retaining ring 28 fitted to the backside of the downwardly flared inner periphery 27 of the bearing ring 17. This means that the roller-supporting ring 5 is revolvably supported by the bearing ring 17.

Therefore, through the agency of the torque springs 18 placed in the cylindrical hollows 13 of the spring-supporting sleeve 12, the bearing ring 17 and the torque-transmitting-roller-supporting ring 5 are both biased downward, and hence the torque-transmitting rollers 4 are kept in pressure contact with the arcuate recesses 10 of the driven member 9.

Figure 7:
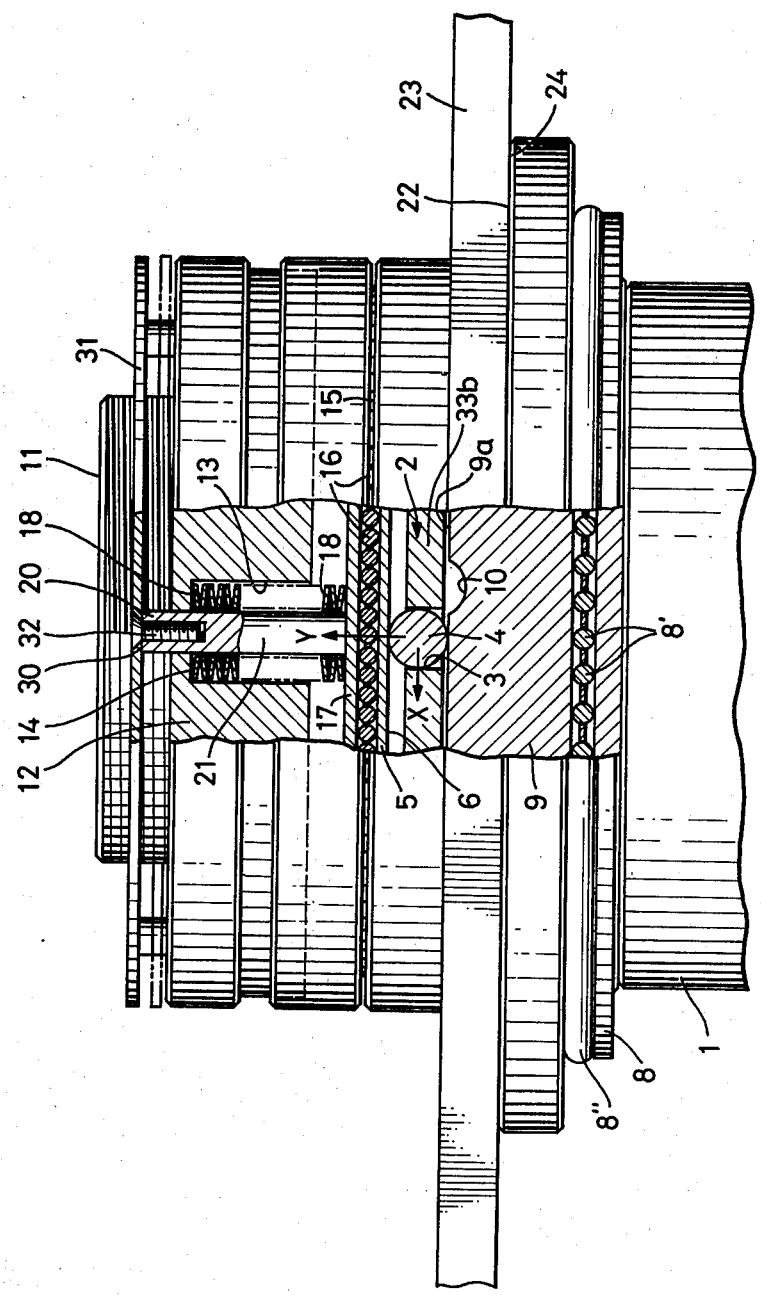
FIG. 7 is a view similar to FIG. 6 but showing the relation between one of the torque-transmitting rollers under overload and the upper arcuate recess of the driven member.

The operation of the torque limiter according to the invention, with the construction as described above, will now be explained. In the arrangements as illustrated in FIG. 3, driving power is given through the driving member 1 to the torque limiter. The driving power is then transmitted to the driven member 9 via the guide cylinder 33a and torque-transmitting rollers 4. The driven member 9 is connected, for example, to a work table 23, and therefore the table is driven, too. If at this point a load beyond a predetermined limit is applied between the driving member 1 and the driven member 9 (that is, the work table 23), the torque-transmitting rollers 4, as typically shown in FIG. 7, will be caused to move in the direction of the arrow X by, and together with, the drive-transmitting body 2 running in the direction X integrally with the driving member 1, away from the arcuate recesses 10 of the driven member 9, overcoming the downward urgings of the torque springs 18. Consequently, the roller-supporting ring 5 in contact with the torque-transmitting rollers 4 and the bearing ring 17 will be raised against the downward urgings of the torque springs 18. In this way, the torque-transmitting rollers 4 are completely disengaged from the arcuate recesses 10 on the upper surface of the driven member 9, with the result that the driving member 1 rotates without load, independently of the driven member 9, shutting off the power transmitted from the driving to the driven member.

The overload-sensing panel 31 is raised to the position indicated by broken lines in FIG. 3 by the upward movement of the support rods 21 with the bearing ring 17. Such a change in position of the overload-sensing panel 31 may be detected by a suitable detector (not shown) so that the signal generated thereby can be utilized as a control signal for varied instruments or other ancillary equipment.

As has been described hereinabove, the construction according to the invention is such that a drive-transmitting body 2 made fast on a driving member 1 has on its outer periphery several radial grooves 3 which, in turn, hold torque-transmitting rollers 4 of a size adapted to fit in the grooves, the upper and lower peripheral surfaces of the rollers 4 being kept in pressure contact with the under end surface 6 of a torque-transmitting-roller-supporting ring 5 above the drive-transmitting body 2 and with arcuate recesses 10 formed on the upper surface of a driven member 9 which is revolvably supported on the upper end surface 7 of the lower portion of the driving member 1 through a thrust bearing ring 8, a torque-spring-supporting sleeve 12 is threadedly engaged at 29 with the outer periphery of the upper mounting portion 11 of the driving member 1, and, between the top walls 14 of open-bottom cylindrical hollows 13 of the torque-spring-supporting sleeve 12 and a bearing ring 17 revolvably supported by a group of bearing balls 16, there are disposed a plurality of torque springs 18, each around one of support rods 21 threadedly engaged at the lower end portions 19 with the bearing ring 17 and loosely fitted at the upper end portions 20 in the sleeve 12. Thus, the torque limiter is equipped with the torque springs whose spring pressure is adjusted by moving the torque-spring-supporting sleeve forward or backward in thread engagement with the driving member. When the limiter is subjected to a torque greater than a predetermined critical value, the torque-transmitting rollers normally forced against the arcuate recesses formed on the driven member are driven out against the urgings of the torque springs and roll axially. For this reason, the critical torque for the limiter can be very conveniently adjusted by simply turning the spring-supporting sleeve and thereby changing the spring pressure of the torque springs.

Also, one mebodiment of the invention is built so that the upper surface 22 of a flange of the driven member 9 is integrally secured to the under surface 24 of a separately provided table 23 by mounting studs 25, the inner periphery 26 of the torque-transmitting-roller-supporting ring 5 and the backside 27 of the flared inner periphery of the bearing ring 17 are supported revolvably by a retaining ring 28 fitted therebetween, and the thrust bearing ring 8 consists of needles 8' of a needle bearing and an O-ring 8". This enables a simple structure to support the torque-transmitting rollers positively and actuate them smoothly. Further, as in another embodiment, an overload-sensing panel 31 is integrally attached to upward extensions 30 of the support rods 21 in the support sleeve 12 by a plurality of mounting screws 32, or, in still another embodiment, the relative positions of the overload-sensing panel 31, torque springs 18, bearing balls 16, torque-transmitting rollers 4, table 23, and thrust bearing ring are such that they are arranged in the order mentioned lest the elastic pressure means of torque springs 18 be adversely affected by the load on the table 23. Therefore, an overload can be positively and easily detected by means of the overload-sensing panel.

In addition, the torque limiter of the invention has the functions of the so-called one-point setting system, in which once the torque transmission has been shut off, the limiter cannot reset at any other point than the shutoff point, because the combinations of the recesses 3, 10 of the drive-transmitting body 2 and the driven member 9 for receiving the torque-transmitting rollers 4 and the individual rollers 4 corresponding to those recesses are made ununiform in indexing angles relative to one another.

While preferred embodiments of the invention have been described using specific terms, such description is for illustrative purposes only, and it is to be understood that changes and variations may be made without departing from the spirit or scope of the following claims.

What is claimed is:

1. A torque limiter characterized in that a drive-transmitting body made fast on a driving member has on the outer periphery thereof several radial grooves which, in turn, hold torque-transmitting rollers of a size adapted to fit in the grooves, the upper and lower peripheral surfaces of said rollers being kept in pressure contact with the under end surface of a torque-transmitting-roller-supporting ring above said drive-transmitting body and with arcuate recesses formed on the upper surface of a driven member which is revolvably supported on the upper end surface of the lower portion of said driving member through a thrust bearing ring, a torque-spring-supporting sleeve is threadedly engaged with the outer periphery of the upper mounting portion of said driving member, and, between the top walls of open-bottom cylindrical hollows of said torque-spring-supporting sleeve and a bearing ring revolvably supported by a group of bearing balls, there are disposed a plurality of torque springs, each around one of support rods threadedly engaged at the lower end portions with said bearing ring and loosely fitted at the upper end portions in said sleeve.

2. A torque limiter according to claim 1, characterized in that the upper surface of a flange of said driven member is integrally secured to the under surface of a separately provided table by mounting studs, the inner periphery of said torque-transmitting-roller-supporting ring and the backside of the flared inner periphery of said bearing ring are supported revolvably by a retaining ring fitted therebetween, and said thrust bearing ring consists of needles of a needle bearing and an O-ring.

3. A torque limiter according to claim 1, characterized in that an overload-sensing panel is integrally attached to upward extensions of said support rods in said support sleeve by a plurality of mounting screws.

4. A torque limiter according to claim 1, characterized in that the relative positions of said overload-sensing panel, torque springs, bearing balls, torque-transmitting rollers, table, and thrust bearing ring are such that they are arranged in the order mentioned lest the elastic pressure means of torque springs be adversely affected by the load on said table.

* * * * *